United States Patent [19]

Monnet

[11] 4,422,842
[45] Dec. 27, 1983

[54] APPARATUS FOR INJECTING PLASTICS AND ELASTOMERS

[75] Inventor: Bernard Monnet, Bellignat, France

[73] Assignee: Pont-A-Mousson S.A., Nancy, France

[21] Appl. No.: 267,979

[22] Filed: May 28, 1981

[30] Foreign Application Priority Data

Jun. 2, 1980 [FR] France .................................. 80 12251
Nov. 28, 1980 [FR] France .................................. 80 25408

[51] Int. Cl.³ .............................................. B29F 1/00
[52] U.S. Cl. ...................................... 425/561; 366/76; 366/78; 425/586
[58] Field of Search ............... 425/208, 560, 561, 586, 425/557; 366/76, 78

[56] References Cited

U.S. PATENT DOCUMENTS

| | | | |
|---|---|---|---|
| 2,881,477 | 4/1959 | Triulzi .................................. | 425/557 |
| 3,021,561 | 2/1962 | Reifenhauser ........................ | 425/208 |
| 3,698,845 | 10/1972 | Paulson ................................ | 425/561 |
| 3,706,827 | 12/1972 | Nott et al. ............................ | 425/561 |
| 4,043,728 | 8/1977 | Holly .................................... | 425/557 |

FOREIGN PATENT DOCUMENTS

| | | | |
|---|---|---|---|
| 1088704 | 9/1960 | Fed. Rep. of Germany ...... | 425/557 |
| 2159056 | 6/1973 | Fed. Rep. of Germany ...... | 425/208 |
| 2426703 | 12/1975 | Fed. Rep. of Germany ...... | 425/208 |
| 1259020 | 12/1961 | France .................................. | 425/557 |
| 38-7224 | 5/1963 | Japan .................................... | 425/208 |
| 39-7625 | 5/1964 | Japan .................................... | 425/557 |
| 49-8700 | 2/1974 | Japan .................................... | 425/557 |
| 49-41110 | 11/1974 | Japan .................................... | 425/557 |
| 890840 | 3/1962 | United Kingdom ................. | 425/208 |

*Primary Examiner*—Jay H. Woo
*Attorney, Agent, or Firm*—Sughrue, Mion, Zinn, Macpeak & Seas

[57] ABSTRACT

An injection apparatus for plastics materials containing glass reinforcing fibers includes a fixed sheath 5, a movable sheath 7 slidably disposed within the fixed sheath, a mixing screw 9 rotatable within the movable sheath, a pressurized supply hopper or funnel 8 for feeding material to the mixing and conveying screw, and a piston/cylinder unit 14–16 for advancing the movable sheath and screw to inject a charge of plastics material within a chamber 26 to a mold M. The supply funnel is coupled to the movable sheath and includes a compression plate 35 controlled by a jack 38 mounted on a sliding plate 39, whereby the compression plate may be retracted into abutment with the sliding plate and laterally withdrawn to enable the reloading of the supply funnel. The mixing screw may be slightly retracted from the movable sheath to form a passage 25 for the plastics material to minimize the shearing of the fibers therein during mixing and conveyance, and the entire apparatus may be separated from the mold by a jack V to avoid undesired thermal transfers between the mold and the injection material.

18 Claims, 8 Drawing Figures

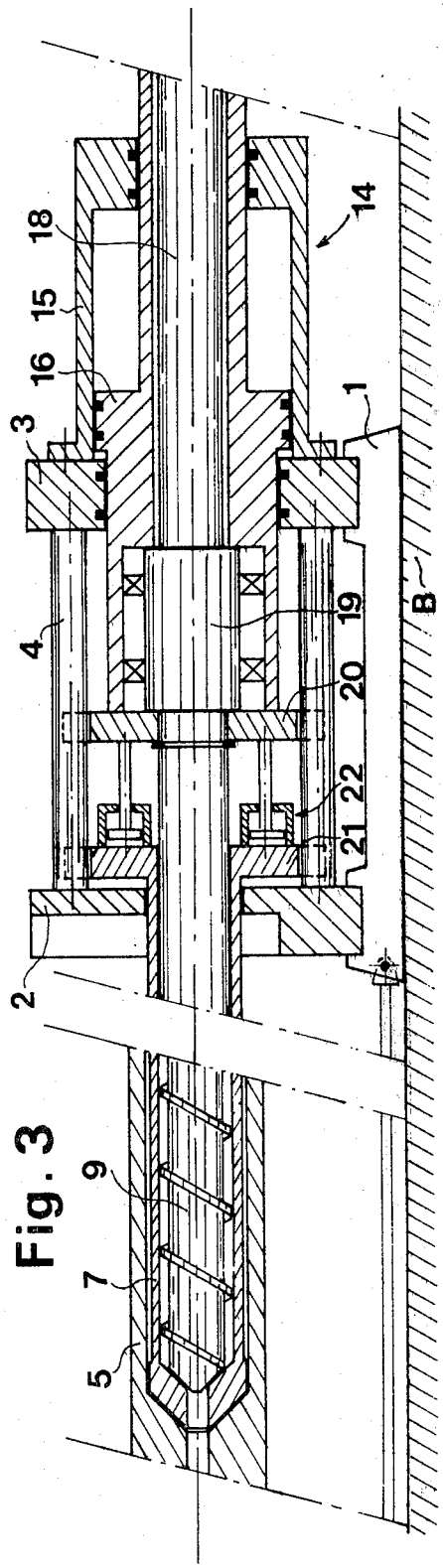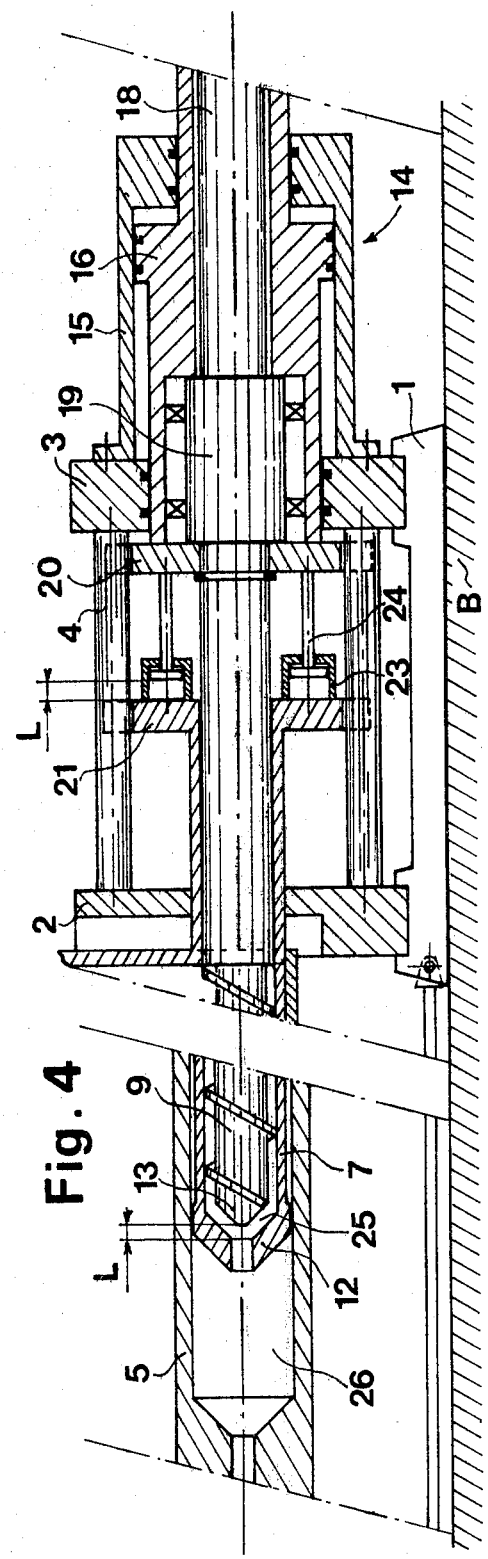

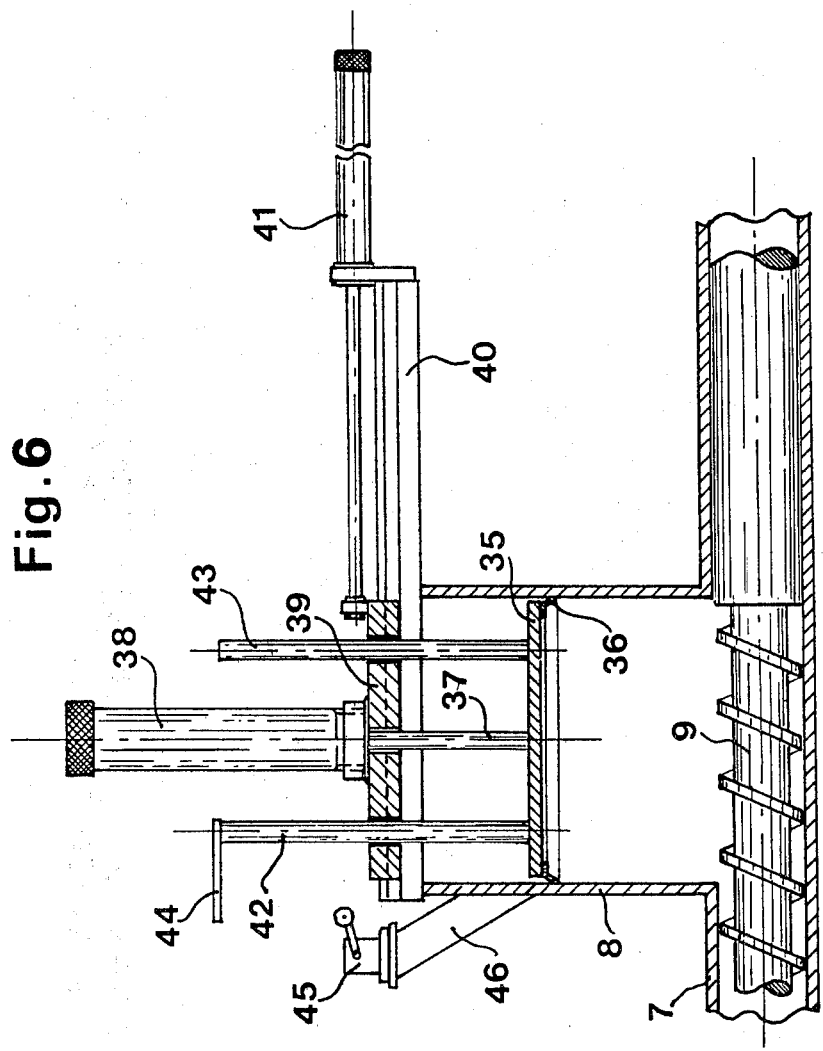

APPARATUS FOR INJECTING PLASTICS AND ELASTOMERS

BACKGROUND OF THE INVENTION

This invention relates to an apparatus for injecting plastics, elastomers, or the like, particularly intended for reinforced plastics such as thermosettable materials containing glass fibers.

In known injection devices the material is brought by means of a feed device, generally funnel-shaped, to a screw located in a fixed sheath where it is mixed and then injected into a mold by the movement of the screw within its sheath. To prevent the mixed material from returning into the screw during the injection phase, the end of the screw is formed as a valve which closes automatically during injection. This has the disadvantage that during the mixing of the material by the screw, the valve forces the material to follow a winding path which can destroy the properties of the material, in particular the breakage of the glass fibers such that the final molded article has limited mechanical properties.

In other known devices this disadvantage is cured by placing the screw in a movable sheath which supports the material feed device and which is mounted to slide within a fixed sheath. This movable sheath, which acts as an injection piston, forms a variable volume chamber together with the fixed sheath for receiving the material to be injected. During such injection this movable sheath, which also acts as a valve with the end of the screw, prevents the material from returning back into the screw.

Since with these prior art constructions the fixed sheath is always connected directly to the mold, the mixed plastics material contained in the sheath prior to its injection is subjected to the influence of the mold temperature. Thus, in the injection of thermoplastic materials where the mold is cooled, the fixed sheath is also cooled on contact with the mold whereby the plastics material becomes hardened and blocks the injection orifice. On the other hand, in the injection of thermosettable materials where the mold is heated to ensure the polymerization of the material, the fixed sheath is also heated so that the material begins to polymerize in the sheath before its injection.

Such undesired thermal transfer can profoundly alter the plastics material when it is brought into the variable volume chamber by the mixing screw, particularly when the chamber is supplied directly with the material by its own weight. In effect, a shearing of this material takes place between the threads of the screw and the internal wall of the movable sheath. When the plastics material additionally contains glass fibers, this shearing effect is particularly onerous since it results in the breakage of the fibers and the subsequent mechanical weakening of the finished molded product. In other known injection devices an Archimedes screw is used to ensure a forced supply of the plastics material, but this does not decrease the shearing of the material in the screw. Further, when the injection apparatus itself does not have a mixing screw, the supply of the plastics material by an Archimedes screw does not allow the variable volume chamber to become filled.

SUMMARY OF THE INVENTION

The present invention overcomes the above noted disadvantages of the prior art by providing an injection apparatus construction including a fixed sheath, a movable sheath slidably disposed within the fixed sheath and defining therewith a variable volume chamber, a plastics material supply device carried by the movable sheath and exiting thereinside, valve means for opening and closing an orifice communicating between the inside of the movable sheath and the variable volume chamber, and means for activating the movable sheath to inject the plastics material into the mold. Connecting means are provided to join the fixed sheath to the activating means, and the entire injection apparatus assembly is movable in relation to the mold.

With such an arrangement the fixed sheath is not permanently attached to the mold and may be separated therefrom at all times except during the actual injection of the plastics material, whereby the deteriorating effects of undesired thermal transfers are totally avoided.

A further feature of the invention resides in the fact that the supply device includes a compression plate urged by a jack against the plastics material in the feed hopper or funnel, but such compression plate may be fully retracted and laterally withdrawn from the funnel to enable the reloading thereof with a fresh charge of plastics material.

BRIEF DESCRIPTION OF THE DRAWINGS

FIG. 3 is an enlarged partial cross-sectional view of the apparatus at the end of an injection cycle, FIG. 4 is a similarly enlarged view of the apparatus during the mixing cycle, FIG. 5 is an enlarged schematic view of the supply device of the injection apparatus, FIG. 6 is a cross-sectional view through line 6—6 of FIG. 5.

DETAILED DESCRIPTION OF THE PREFERRED EMBODIMENTS

Figure 1:
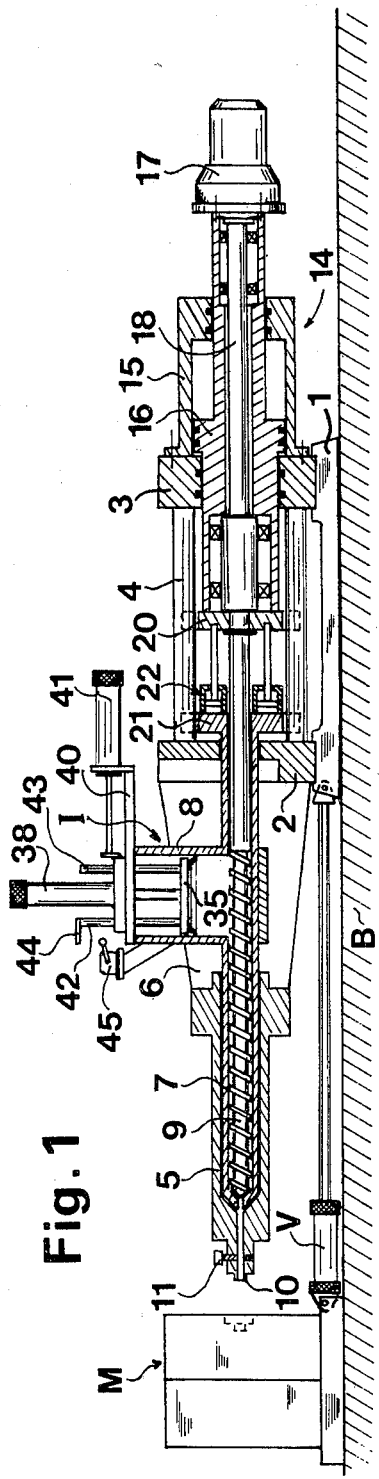
FIG. 1 is a schematic cross-sectional view of an injection apparatus according to the invention at the end of the injection of the material.
Figure 2:
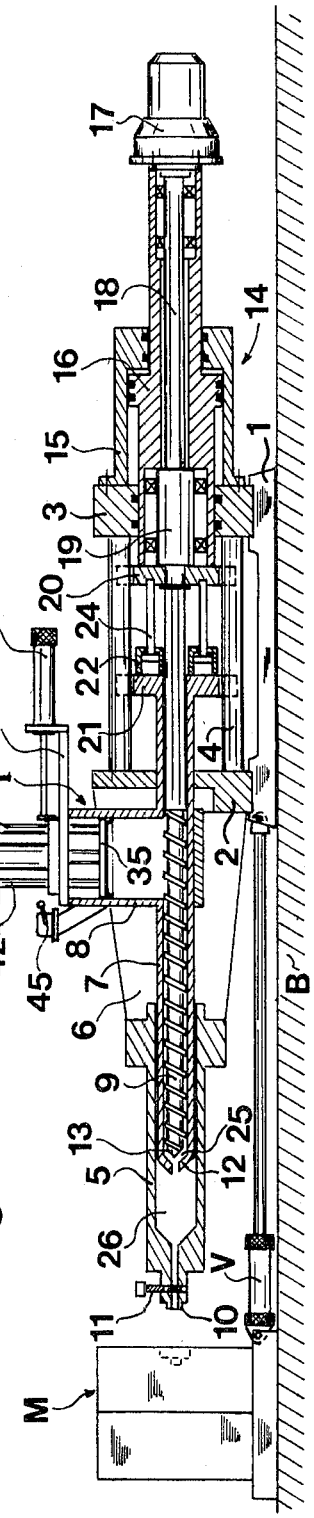
FIG. 2 is a similar view of the apparatus during the mixing of the material.

In the example shown in FIGS. 1 to 6, the invention is applied to an injection mold M integral with a frame B to obtain reinforced plastic elements, in particular containing glass fibers. An injection apparatus I according to the invention is mounted to slide under the action of a jack V on frame B.

The injection device I comprises a sole plate 1 bearing first and second upstanding and parallel frame plates 2, 3 connected to each other by four parallel columns 4. A fixed cylinder or sheath 5 is connected to the first plate 2 by two flat parallel plates 6 which form fixing means and which are located on either side of a second movable cylinder or sheath 7 which slides in the sheath 5 and first plate 2, and which carries a feed funnel 8 for the supply of plastic. A mixing screw 9 is slidably and rotatably mounted inside the sheath 7, and the sheath 5 is fitted on its end adjacent the mold M with an exit nozzle or orifice 10 having a disconnecting tap 11. The movable sheath 7 has a generally conically shaped nozzle 12 at its end cooperable with the conical end 13 of the mixing screw 9 to form a valve.

The means for activating the injection apparatus comprises a jack 14 having a base formed by the second plate 3 and a cylinder 15 housing a piston 16. The piston supports, on its end opposite screw 9, an electric or hydraulic motor 17 which rotates the screw via a stem 18, freely rotatable inside the piston 16 but supported by a bearing 19 within the piston and by a butt plate 20 connected thereto. The end of the movable sheath 7, opposite the nozzle, is formed by a collar plate 21 parallel to the butt plate 20 and connected thereto by two diametrically opposite jacks 22, each having a cylinder 23 connected to the collar plate and a piston 24 connected to the butt plate.

A material supply device formed by the funnel 8, as best shown in FIGS. 5 and 6, has an elongated cross-section and a width more or less equal to the diameter of the movable sheath 7 on which it takes support and into which it exits. The funnel 8 contains a retractable device for compressing the material formed of a horizontal compression plate 35 slightly smaller than the internal dimensions of the funnel to slide therewithin via a watertight joint 36 having a lip fixed to the periphery of the plate and bearing against the internal wall of the funnel. The compression plate 35 is connected to the stem 37 of a vertical jack 38 which extends through a plate 39 supporting the jack. The plate 39 slides in two parallel horizontal guides 40 mounted on the funnel 8 and projecting beyond it by a length at least equal to the length of the funnel. The plate 39 is disposed above the walls of the funnel by a height greater than the thickness of the compression plate 35 and the watertight joint 36, and is moved by a jack 41 supported by the horizontal guides 40. Two guide rods 42, 43 connected to the plate 35 extend through the plate 39. One of the guides has a finger 44 intended to cooperate with a contactor 45 on an arm 46 connected to the funnel.

In operation, when jack V is in a position such that the injection apparatus I is separated from the mold M, and the piston 16 is advanced against the second plate 3 and the deactivated jacks 22, the screw 9 and the movable sheath 7 under the action of the collar plate 21 are in an advanced position against the nozzle 10 of the fixed sheath 5. The material supply device is in a retracted position whereat the compression plate 35 has been drawn upwardly by the jack 38 to abut the lower surface of plate 39, which is then withdrawn from the mouth of the funnel 8 by the retraction of jack 41.

The piston 16 is then withdrawn by a length L to open a small passage or canal 25 between the conical end 13 of the screw 9 and the end 12 of the movable sheath 7. This minor withdrawal movement is implemented by pressurizing the jacks 22.

The thermosettable glass fiber containing plastic to be injected is next loaded into the funnel 8 through its open or exposed top, whereafter the jack 41 is actuated to slide the plate 39 in its guides 40 back over the top of the funnel 8. Jack 38 is then actuated to urge the compression plate 35 downwardly into the funnel and against the plastic material loaded therein, with the lip of the watertight joint 36 providing a tight seal against the wall of the funnel. The motor 17 is then energized to rotate screw 9, which simultaneously conveys and mixes a charge of injection material from the bottom of funnel 8 towards and into a chamber 26 defined between the end 12 of the movable sheath 7 and the disconnecting tap 11 of the closing orifice 10 of the fixed sheath 5. As the pressure of this material within chamber 26 increases, the movable sheath 7, screw 9 and piston 16 are further withdrawn to the right in FIG. 2; the pressurized jacks 22 maintain the passage 25 open.

When the quantity of plastic material desired for a particular molding operation resides within chamber 26, the rotation of the screw 9 is halted and the pressure exerted by jack 38 on the material remaining in the funnel 8 is relieved.

Jack V is next activated to slide the sole plate 1 along bed B until the injection orifice 10 is engaged with mold M, which enables the commencement of the injection phase. This is implemented by depressurizing the jacks 22 and activating jack 14, which pushes screw 9 towards the mold M and into abutment against the end 12 of the movable sheath 7, which closes the passage 25. The advancing screw 9 and sheath 7 thus compress the material in chamber 26, which injects such material through the opened tap 11 into the mold until the nozzle end 12 of the movable sheath seats against the end of the fixed sheath 5.

When the injection of the material is completed the entire injection apparatus is separated from the mold by the jack V, whereafter a new injection cycle may begin.

Just before the point at which the plastic material in funnel 8 becomes exhausted, with the compression plate 35 near the bottom of its travel, the finger 44 on guide rod 42 engages contactor 45, which reverses the pressurization of jack 38 to withdraw the compression plate 35. With the latter in its uppermost position the plate 39 is moved laterally on guides 40 by its jack 41 to expose the top of the funnel and thereby enable the loading of an additional charge of plastic material. During the withdrawal of the compression plate 35 the rotation of screw 9 is halted to avoid any shearing of the plastic material remaining between the helix thereof.

With this invention the injection apparatus may be moved in relation to or withdrawn from the mold to thereby minimize the contact times between the mold M and the fixed sheath 5. This feature enables any unwanted heat and/or cold transfer between the mold and the injection apparatus to be substantially avoided. The heat for the injection of thermosettable materials or the cold in the case of thermoplastic materials creates the polymerization of the material or its hardening through cooling, respectively, in the nozzle 10 and in the chamber 26 of the fixed sheath 5. This movement of the injection apparatus in relation to the mold is obtained due to the connection of the fixed sheath 5 to the injection jack 14 by the parallel plates 6.

This invention also facilitates the injection of plastic thermosettable materials containing glass or other fibers by reason of the opened passage 25 allowing the smooth passage of such materials without causing any breakage of the fibers. In addition, the material is conveyed between the screw and the movable sheath at a relatively high pressure whereby it passes through the mixing zone in a comparatively short time. This further limits any undesired shearing or breakage of the fibers contained in the material, whereby the final molded articles have an increased mechanical strength or resistance. Such shearing is reduced since, due to the pressure exerted by the compression plate 35 in the supply device, the material is effectively advanced by one full thread for each turn of the screw.

A further advantage of the invention is that since the motion between the movable sheath 7 and the screw 9 is limited to a relatively short distance L, the plastics material introduced through the funnel 8 is mixed over a fairly constant length—independent of the length of chamber 26—to produce more uniform results.

Since the screw 9 ensures the movement of the sheath 7 during injection by the engagement therewith of its end opposite the end 13, the size of the jacks 22 may be minimized since they are not required to transmit the massive injection forces but need only develop sufficient pressure to separate the movable sheath 7 and the screw 9 by the distance L.

Since the connecting plates 6 between the fixed sheath 5 and the screw drive and advancing components straddle the funnel 8, a large supply funnel may be provided to thus facilitate the delivery of the injection material over a plurality of cycles without deterioration.

Figure 7:
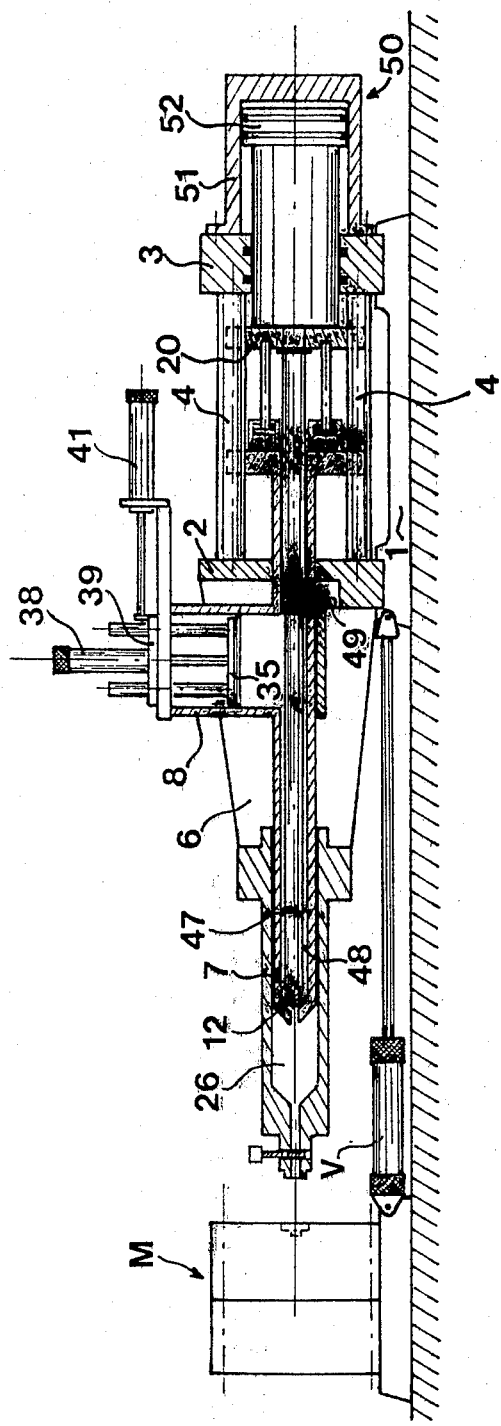
FIG. 7 is a schematic cross-sectional view, on the same scale as FIG. 1, of an alternate embodiment of the invention.

In the alternate embodiment shown in FIG. 7 the conveyor screw is replaced by a cylindrical and non-rotatable push rod 47 disposed within the movable sheath 7 to define therewith an annular chamber 48 for the passage of the injection material. The push rod 47 is connected to the butt plate 20 by a stem 49 whose diameter is approximately equal to the inner diameter of the movable sheath. An injection jack 50 for actuating the injection apparatus comprises a cylinder 51 connected to the second plate 3 and a piston 52 extending through the plate 3 and connected to the butt plate 20. In this embodiment the supply device operates under pressure in the same manner as above, but exclusively serves to introduce the plastics material into the chamber 26 by forcing its passage through the annular chamber 48. Such an arrangement further decreases any shearing of the plastics material or the breakage of any fibers therein during its transfer from the supply funnel 8 to the chamber 26, and the elimination of the screw rotation simplifies the overall construction of the apparatus.

Figure 8:
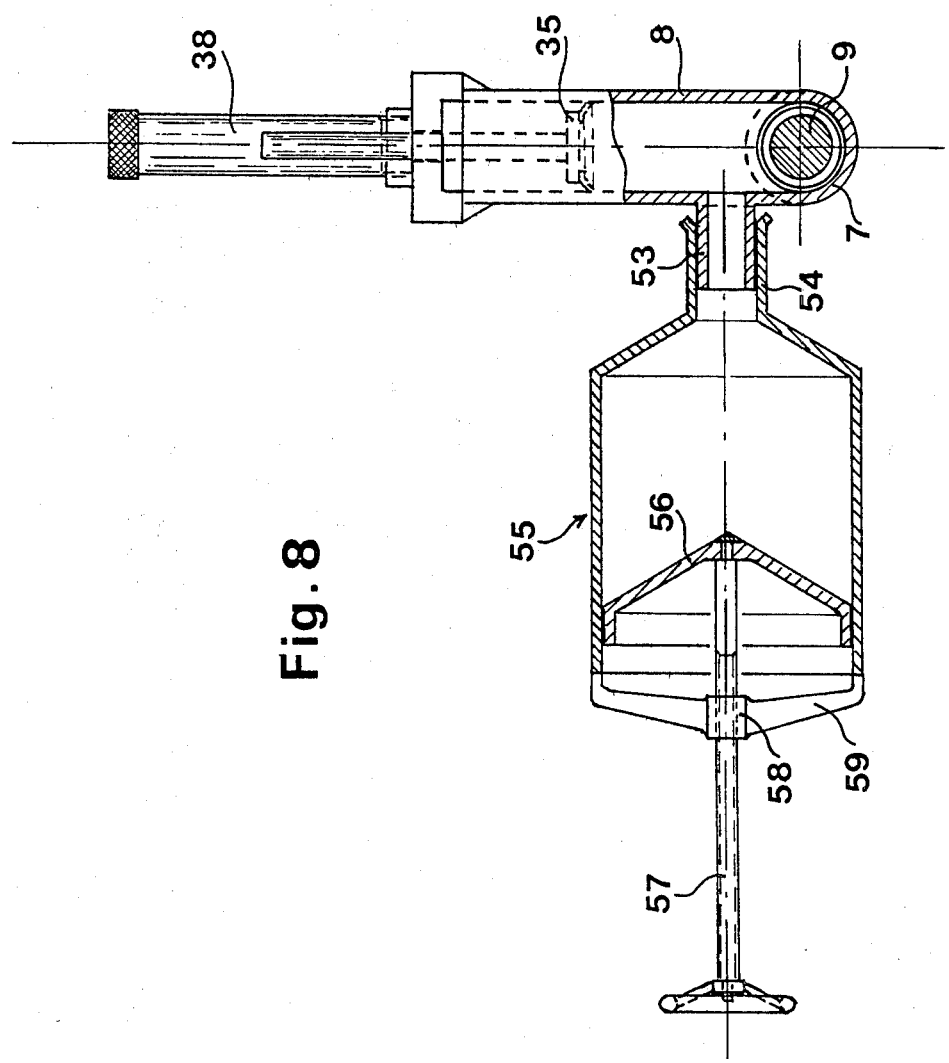
FIG. 8 is a schematic partial cross-sectional view of an alternate embodiment of the supply device of the invention.

In the alternate supply device embodiment shown in FIG. 8 the funnel 8 carries a cylindrical pipe 53 on one side which mates with a mouthpiece 54 of a supply container 55 having a slidable cover 56 driven by a threaded shaft 57 journaled in a nut 58 of a yoke 59 fixed to the container. With such an arrangement the funnel 8 may be filled or recharged from the container 55 by rotating the shaft 57 to drive the cover 56 inwardly, with the threaded engagement between the shaft 57 and the nut 58 preventing the return of the material into the container during the downward stroke of the compression plate 35. The container 55 may itself be filled separately by an attached device, not shown, such as an Archimedes screw system. With the embodiment of FIG. 8 the tracks 40 and jack 41 may be eliminated, and the manipulation of the plastics material during its introduction into the funnel 8 is minimized.

What is claimed is:

1. An injection apparatus for plastics, elastomers or like materials, comprising: an elongate, hollow fixed sheath (5) having an injection orifice (10) at an exit end thereof, an elongate, smooth walled, hollow movable sheath (7) slidably disposed within the fixed sheath and defining therewith proximate said exit end a variable volume injection material chamber (26), an injection material supply device (8) mounted to and movable with the movable sheath and exiting into the hollow interior thereof, an orifice defined in an exit end of said movable sheath communicating between the hollow interior thereof and the variable volume chamber, valve means (12, 13) for opening and closing said movable sheath orifice, means (22) for selectively actuating said valve means, said actuating means comprising separation jacks (22), said separation jacks maintaining said valve means in an open state as said injection material supply device supplies said injection material into said variable volume injection material chamber, means (14) for advancing the movable sheath with the fixed sheath to reduce the volume of said chamber and force injection material through said fixed sheath orifice and into a mold (M), means (6) rigidly connecting the fixed sheath to the advancing means, and means (V) for moving the injection apparatus in relation to the mold to minimize thermal heat exchange therebetween.

2. The injection apparatus of claim 1, wherein the fixed sheath is connected by the connection means to a first plate (2) supporting the advancing means.

3. The injection apparatus of claim 2, wherein the first plate is connected to second plate (3) which forms the base of an injection jack of the advancing means.

4. The injection apparatus of claim 3, wherein the connection means are parallel plates.

5. The injection apparatus of claim 4, wherein the supply device comprises a funnel situated between the connection means plates (6).

6. The injection apparatus of claim 5, wherein the movable sheath is connected to a piston of the injection jack by separation jacks (22), which comprise the valve actuating means.

7. The injection apparatus of claim 6, wherein the supply device comprises means for compressing the material in the funnel.

8. The injection apparatus of claim 7, wherein the compression means comprises a retractable compression plate (35) moved by a compression jack (38) supported by the funnel.

9. The injection apparatus according to claim 8, wherein the compression jack (38) is connected to a plate (39) slidable in guides (40) fixed to the funnel.

10. The injection apparatus of claim 9, wherein the compression plate (35) has a watertight joint (36) on its periphery for sealing against the interior walls of the funnel.

11. The injection apparatus of claim 10, wherein the funnel has a contactor (45) for limiting the downward movement of the compression plate.

12. The injection apparatus of claim 8, wherein the funnel has a detachable supply container (55) having a sliding cover (56).

13. The injection apparatus of claim 8, wherein the movable sheath surrounds a mixing screw (9) for feeding material from the funnel into the variable volume chamber, and wherein the valve means is formed by the movable sheath and an end of the screw.

14. The injection apparatus of claim 8, wherein the movable sheath houses a slidable stem (47) defining therewith an annular chamber (48) for the passage of material, and wherein the valve means is formed by the movable sheath and an end of the stem.

15. The injection apparatus of claim 1, wherein said separation jacks maintain said valve means in a closed state as said injection material is discharged from said variable volume injection material chamber through said fixed sheath orifice into said mold.

16. The injection apparatus of claim 15, further comprising a screw (9) rotatably mounted within said hollow interior of said movable sheath for supplying said injection material from said hollow interior through said movable sheath orifice when said valve means is open.

17. The injection apparatus of claim 16, wherein said valve means comprises a front surface (13) of said screw and an inside front surface (12) of said movable sheath which is adjacent to said movable sheath orifice.

18. The injection apparatus of claim 17, wherein said supply device further comprises a supply jack (38) for activating a retractable compression plate (35).

* * * * *